US012602235B2

(12) United States Patent
Emby

(10) Patent No.: US 12,602,235 B2
(45) Date of Patent: Apr. 14, 2026

(54) USER PRESENCE DETECTION KEYBOARD WITH CONFIGURABLE SLEEP MODE CONTROL

(71) Applicant: Tricklestar Limited, Singapore (SG)

(72) Inventor: Bernard Christopher Emby, Kuala Lumpur (MY)

(73) Assignee: Tricklestar Limited, Singapore (SG)

( * ) Notice: Subject to any disclaimer, the term of this patent is extended or adjusted under 35 U.S.C. 154(b) by 0 days.

(21) Appl. No.: 18/289,460

(22) PCT Filed: Feb. 11, 2022

(86) PCT No.: PCT/IB2022/051218
§ 371 (c)(1),
(2) Date: Nov. 3, 2023

(87) PCT Pub. No.: WO2022/234347
PCT Pub. Date: Nov. 10, 2022

(65) Prior Publication Data
US 2024/0241732 A1    Jul. 18, 2024

Related U.S. Application Data

(63) Continuation-in-part of application No. 17/307,104, filed on May 4, 2021, now abandoned.

(51) Int. Cl.
*G06F 9/4401* (2018.01)
*G06F 3/02* (2006.01)

(52) U.S. Cl.
CPC ............ *G06F 9/4418* (2013.01); *G06F 3/021* (2013.01); *G06F 3/0227* (2013.01)

(58) Field of Classification Search
CPC ....... G06F 9/4418; G06F 3/021; G06F 3/0227
See application file for complete search history.

(56) References Cited

U.S. PATENT DOCUMENTS

| | | | |
|---|---|---|---|
| 6,560,711 B1 | 5/2003 | Given et al. | |
| 2002/0056046 A1 | 5/2002 | Klein | |

(Continued)

FOREIGN PATENT DOCUMENTS

| | | | |
|---|---|---|---|
| CN | 102346534 A | * | 2/2012 |

*Primary Examiner* — Kim Huynh
(74) *Attorney, Agent, or Firm* — The Webb Law Firm

(57) ABSTRACT

A system for putting a computer device into sleep mode, the system being configured to (a) activate a timer to count for a predetermined amount of time; (b) generate motion data with a radar module; (c) if motion data received from the radar module indicates that movement of a user of the computer device has been detected, then repeat steps (a) & (b); (d) if the timer has not expired, then repeat step (b); and (e) send a sleep mode instruction to the computer device. The system can be configured to include the following configurations (i) processing the motion data on the keyboard, and the sleep mode instruction is generated by the system to put the computer device into sleep mode; or (ii) processing the motion data on the keyboard, and the sleep mode instruction is generated by the computer device to put the computer device into sleep mode; or (iii) processing the motion data on the computer device, and the sleep mode instruction is generated by the computer device to put the computer device into sleep mode.

18 Claims, 14 Drawing Sheets

(56)            References Cited

U.S. PATENT DOCUMENTS

| | | | |
|---|---|---|---|
| 2005/0278560 A1* | 12/2005 | Wu | G06F 1/3203 |
| | | | 713/320 |
| 2007/0296701 A1 | 12/2007 | Pope et al. | |
| 2010/0122077 A1* | 5/2010 | Durham | G06F 12/0284 |
| | | | 711/E12.002 |
| 2012/0030752 A1 | 2/2012 | Bruno et al. | |
| 2012/0032894 A1 | 2/2012 | Parivar et al. | |
| 2017/0147057 A1 | 5/2017 | Emby | |
| 2017/0255245 A1* | 9/2017 | Emby | G06F 1/3231 |
| 2020/0356160 A1 | 11/2020 | Kosugi et al. | |
| 2021/0025976 A1 | 1/2021 | Chandel et al. | |

* cited by examiner

100

62

64

10

α

X

14

β

Y

10

USER PRESENCE DETECTION KEYBOARD WITH CONFIGURABLE SLEEP MODE CONTROL

CROSS REFERENCE TO RELATED APPLICATIONS

This application is the United States national phase of International Patent Application No. PCT/IB2022/051218 filed Feb. 11, 2022, and claims priority to U.S. patent application Ser. No. 17/307,104 filed May 4, 2021, the disclosures of which are hereby incorporated by reference in their entireties.

BACKGROUND OF THE INVENTION

Field of the Invention

The present invention relates to a keyboard and a keyboard system.

Description of Related Art

In order to save energy, computers and other electronic devices may be configured to enter a low-power, 'sleep' or 'stand-by' mode when they are not in use. Traditionally, this has been done manually, i.e., by a user actively changing the device to a sleep state when consciously deciding to cease using the device for a period of time. For example, a television may be put into a sleep state by pressing a corresponding button on a remote control, and a laptop computer may be put into a low-power mode by closing its lid or pressing a 'sleep' key.

In light of the power saving benefits associated with the sleep state, many computing devices have been configured to automatically enter the sleep state if no user activity is detected for a predetermined period of time—typically 10 to 15 minutes, for example. Activity is ordinarily monitored by software executed by the device, which monitors activity relating to peripheral devices such as keyboard strokes and/or mouse movement. The user may be able to configure settings of the software to customise the period of time after which the device will enter the sleep state if no activity is detected.

A common problem with such mechanisms is that they can erroneously enter a sleep state while still in normal use. These difficulties have become more prominent in recent times with increased working from remote office locations. A user may often be using a device without actively engaging with any peripheral devices or otherwise moving around. For example, a user may be reading a document on screen for an extended period of time without moving the mouse or typing on the keyboard, or using the computing device for video conferencing, or playing digital media. To overcome such issues, some users have adjusted their device settings to require a far longer period of time to pass without (peripheral device) activity before the device enters its sleep state. For example, a user may adjust the period of time to 90 minutes so they are able to watch films on their computing device without it automatically entering its sleep state.

As a result, even after being used for other purposes, computing devices remain on for extended periods of time, even after the user has ceased to use the device. Not only does this result in unnecessary power consumption, but it may cause confidential or otherwise sensitive content to remain visible (e.g., on a display of a computer device) and accessible on the device while the device is not in use or not controlled by the authorised user.

Furthermore, remote and co-working arrangements, where workers are not undertaking their work activities at a secure premises (such as an office) and/or may be sharing their workspace with individuals from other workplaces, are rapidly increasing in popularity. These kinds of environments underscore the need to maintain privacy and security of confidential work materials that may be accessed and displayed on computing devices. To address this, most computers include locking functionality. In "Lock" mode, the user interface is "locked", requiring username and password, for example, to gain entry into the user profile. In this mode, the computer remains powered normally, with all systems operational.

To enter lode mode, a user can manually log out of his or her profile and then walk away from the device with the data safely protected. Further, some keyboards include a 'lock' key that, when pressed, put the computer into lock mode. Difficulties can arise with data protection because, in either cases, human input is needed to enter lock mode. As such, there will often be times when the user forgets to lock the computer and, as such, his or her data is unprotected.

The use of "Lock" achieves the Security/Privacy objective but not the energy saving objective. To achieve both goals, some computer devices are configurable to ensure that:

(a) the computer device goes into sleep mode when user input is not detected for a predetermined amount of time; and (b) when the computer device is woken up from sleep mode, the user is prompted for a user name and password.

However, not all users configure their computers in this manner and, as such, data may not be secure when the user walks away from the computer.

Alternative means for automatically transitioning a device to a sleep state include use of a motion sensor to detect movement of the user. When the motion sensor does not detect movement for a predetermined period of time, the device may be caused to enter its sleep state. However, motion sensors currently in use, such as passive infrared (PIR) sensors, have limited sensitivity and are only capable of detecting significant movement. Therefore, systems using these sensors must generally be configured with long predetermined periods of time before a device is put into its sleep state. This is because use of a short predetermined period of time may result in the device unnecessarily entering its sleep state simply because the user has not made any significant movements, such as the user reading a document on screen. Meanwhile, this requirement to use longer time periods reduces the opportunity limit power consumption and increases the danger of data stored on devices being exposed to unnecessary risk when a user walks away from their device.

It is generally desirable to overcome or ameliorate one or more of the above mentioned difficulties, or at least provide a useful alternative.

SUMMARY OF THE INVENTION

In accordance with one aspect of the invention, there is provided a system for putting a computer device into sleep mode, the system being configured to:

(a) activate a timer to count for a predetermined amount of time;

(b) generate motion data with a radar module;

(c) if motion data received from the radar module indicates that movement of a user of the computer device has been detected, then repeat steps (a) & (b);

(d) if the timer has not expired, then repeat step (b); and (e) send a sleep mode instruction to the computer device.

In accordance with one aspect of the invention, there is provided a system being configured to:

(a) activate a timer to count for a predetermined amount of time;

(b) generate motion data with a radar module;

(c) if motion data received from the radar module indicates that movement of a user of the computer device has been detected, then repeat steps (a) & (b);

(d) if the timer has not expired, then repeat step (b); and (e) send a lock mode instruction to the computer device.

Preferably, the radar module includes a radar sensor that is disposed on a front side of a keyboard that, at least in part, houses the system. The radar sensor is centrally disposed on the front side of the keyboard.

Preferably, the radar module includes a radar sensor that is disposed on a lateral side of a keyboard that, at least in part, houses the system.

Preferably, the radar sensor is directed upwards to scan an upper section of the user. The system claimed in claim 6, wherein the angle of the radar sensor is adjustable with respect to a horizontal plane.

Preferably, the system includes a user configurable timing switch for setting the predetermined amount of time for the timer. The user configurable timing switch includes at least the following settings:

(a) 30 seconds;

(b) 3 minutes; and (c) 6 minutes.

Advantageously, the system is housed within the keyboard. Alternatively, the system is housed partly within the keyboard and partly within the computer device.

Preferably, the system is configured to send a lock mode instruction to the computer device in addition to the sleep mode instruction.

In accordance with the invention, there is also provided, a system for putting a computer device into sleep mode, including one or more processors in communication with:

(a) a radar module for detecting movement of the user; and (c) data storage, including instructions stored thereon that, when executed by the one or more processors, cause the system to perform the steps of:

(i) activating a timer to count for a predetermined amount of time;

(ii) generate motion data from with the radar module;

(iii) if the motion data indicates that movement has been detected, then repeat steps (i) to (ii);

(iv) if the timer has not expired, then repeat step (ii);

(v) sending a sleep mode instruction to the computer device.

In accordance with the invention there is also provided a system for putting a computer device into lock mode, including one or more processors in communication with:

(a) a radar module for detecting movement of the user; and (c) data storage, including instructions stored thereon that, when executed by the one or more processors, cause the system to perform the steps of:

(i) activating a timer to count for a predetermined amount of time;

(ii) generate motion data from with the radar module;

(iii) if the motion data indicates that movement has been detected, then repeat steps (i) to (ii);

(iv) if the timer has not expired, then repeat step (ii);

(v) sending a lock mode instruction to the computer device

Preferably, the radar module includes a radar sensor that is disposed on a front side of a keyboard that, at least in part, houses the system. Preferably, the radar sensor is centrally disposed on the front side of the keyboard. Alternatively, the radar module includes a radar sensor that is disposed on a lateral side of a keyboard that, at least in part, houses the system.

The radar sensor is preferably directed upwards to scan an upper section of the user. The angle of the radar sensor is preferably adjustable with respect to a horizontal plane.

Preferably, the system includes a user configurable timing switch for setting the predetermined amount of time for the timer. The user configurable timing switch includes at least the following settings:

(a) 30 seconds;

(b) 3 minutes; and (c) 6 minutes.

Advantageously, the system is housed within the keyboard. Alternatively, the system is housed partly within the keyboard and partly within the computer device.

In accordance with the invention, there is also provided a keyboard including:

(a) a keyboard housing; and (b) the above described system.

BRIEF DESCRIPTION OF THE DRAWINGS

Preferred embodiments of the present invention are hereafter described, by way of non-limiting example only, with reference to the accompanying drawing in which.

DESCRIPTION OF THE INVENTION

Figure 1:
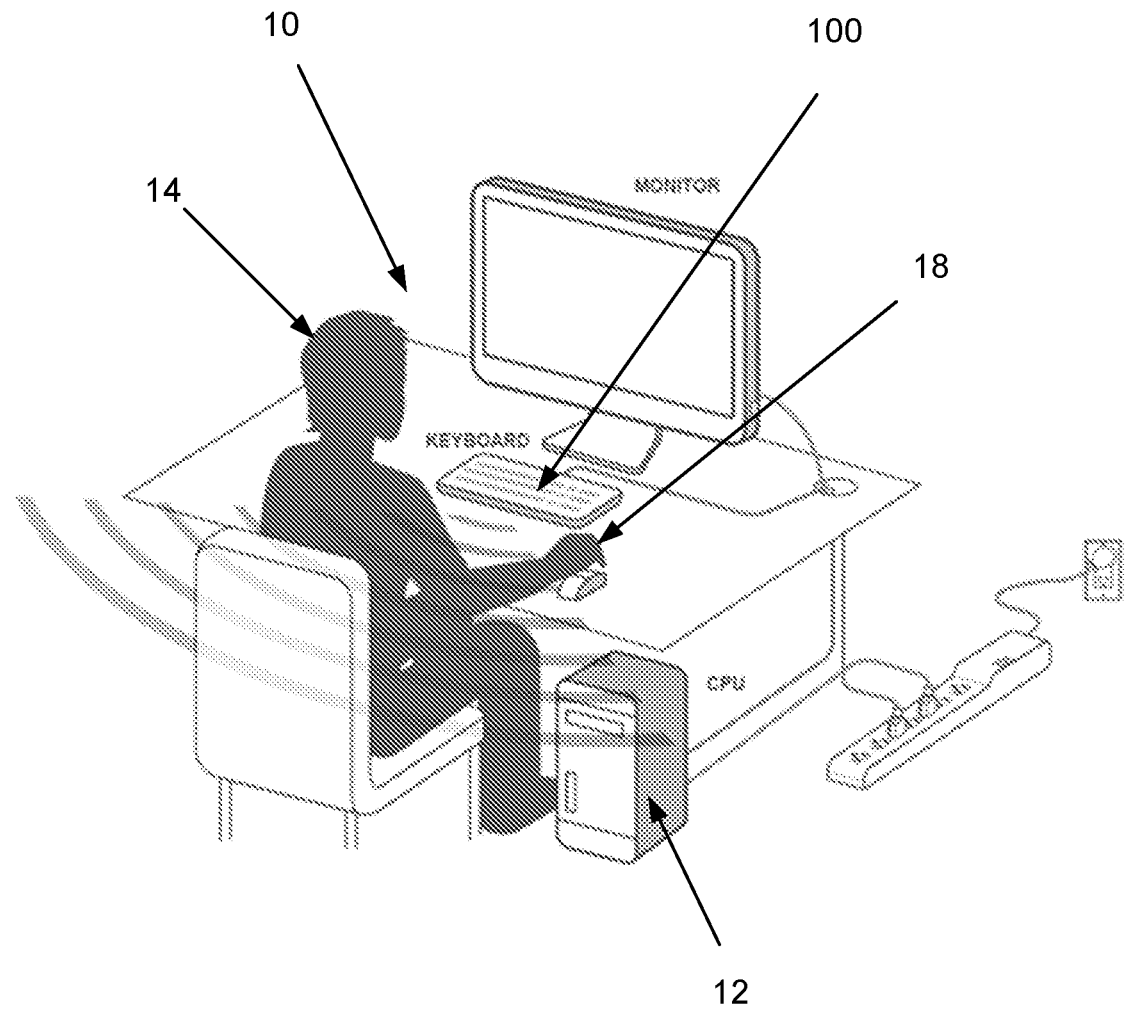
FIG. 1 is an illustration showing a system for putting a computer device in sleep mode.

The system 10 shown in FIG. 1 is used to put the computer device 12 into sleep mode when the presence of a user 14 is no longer detected. The system 10 is configured to:

(a) activate a sleep timer to count for a predetermined amount of time;

(b) generate motion data with a radar module;

(c) if motion data received from the radar module indicates that movement of a user of the computer device 12 has been detected, then repeat steps (a) & (b);

(d) if the sleep timer has not expired, then repeat step (b); and (e) send a sleep mode instruction to the computer device 12.

Advantageously, the system 10 can be configured to set the predetermined period to any suitable time, such as thirty seconds, three minutes, six minutes, or longer Sleep mode is a power-saving state for the computer device 12. In such a state, all actions on the computer 12 are suspended and any open documents and applications are stored into memory, for example. Normal, full-power, operation can be resumed within a few seconds, typically via keyboard or mouse input. Before gaining access to their profile, the user will be prompted to enter a password. On Windows computers 12 this is configurable. By default most computer network systems administrators for a corporate entity would configure this setting via Windows Domain Group Policy to always require a user password to be entered when a PC resumes from sleep. For a home user, the setting is configurable as the user chooses.

In order to safe guard against the requirement for manually configuring the computer device 12 to enter lock mode in the above described manner, some embodiments of the system 10 are configured to send a lock mode instruction to the computer device 12 instead of the sleep mode instruction. In this embodiment, the system 10 puts the computer device 12 into lock mode when the presence of a user 14 is no longer detected data is protected.

Alternatively, the system 10 is configured to send a lock mode instruction to the computer device 12 in addition to the sleep mode instruction. In this embodiment, the system 10 has the benefits of power savings, together with certainty that the data is protected when the computer device 12 enters sleep mode.

For ease of description, the system 10 is below described by way of reference to sending a sleep mode instruction to the computer device. However, the system 10 can be configured to alternatively send a lock mode instruction, or both.

The system 10 is described, by way of non-limiting example, for use with a Microsoft Personal Computer 12 and an Apple Mac 12. The system 10 is, however, in no way limited to usage with these devices 12 alone. Rather, the system 10 could be configured for usage with any suitable computed device 12.

Architecture

Figure 2:
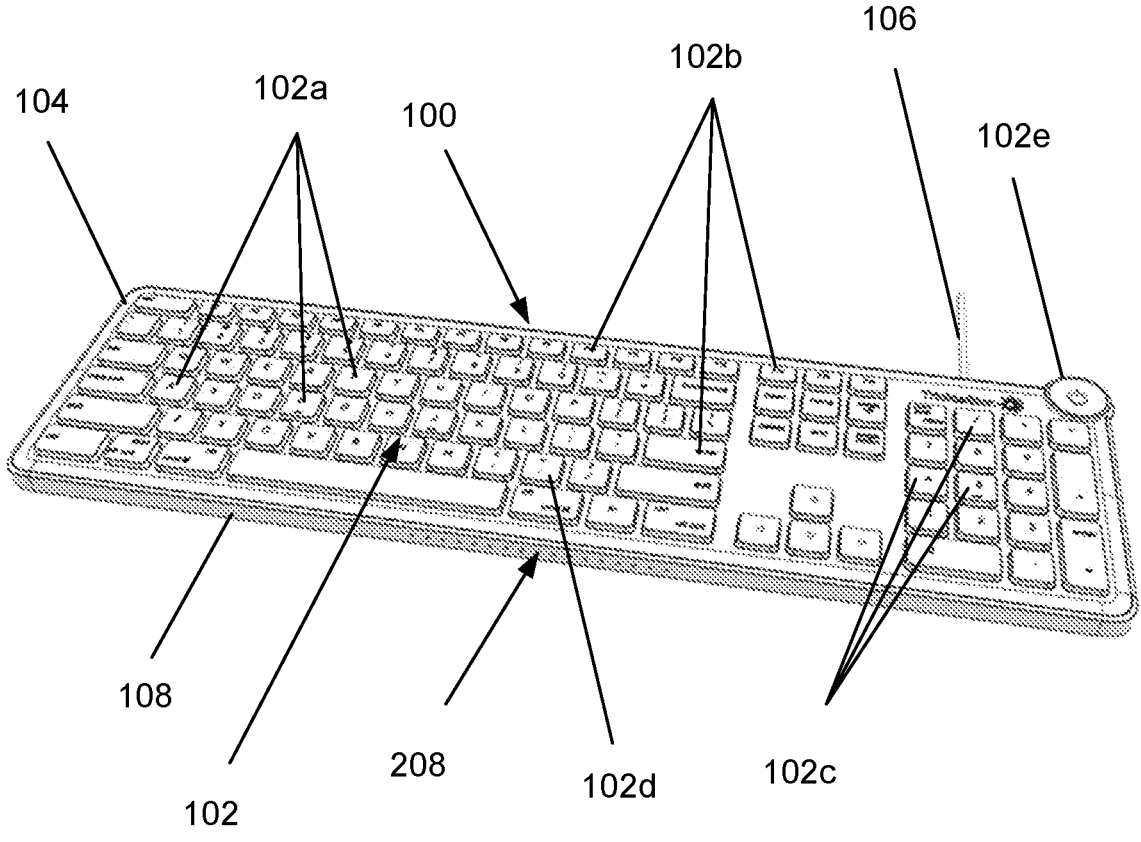
FIG. 2 is a perspective view of an illustrative example of a keyboard for use with the system shown in FIG. 1.
Figure 3:
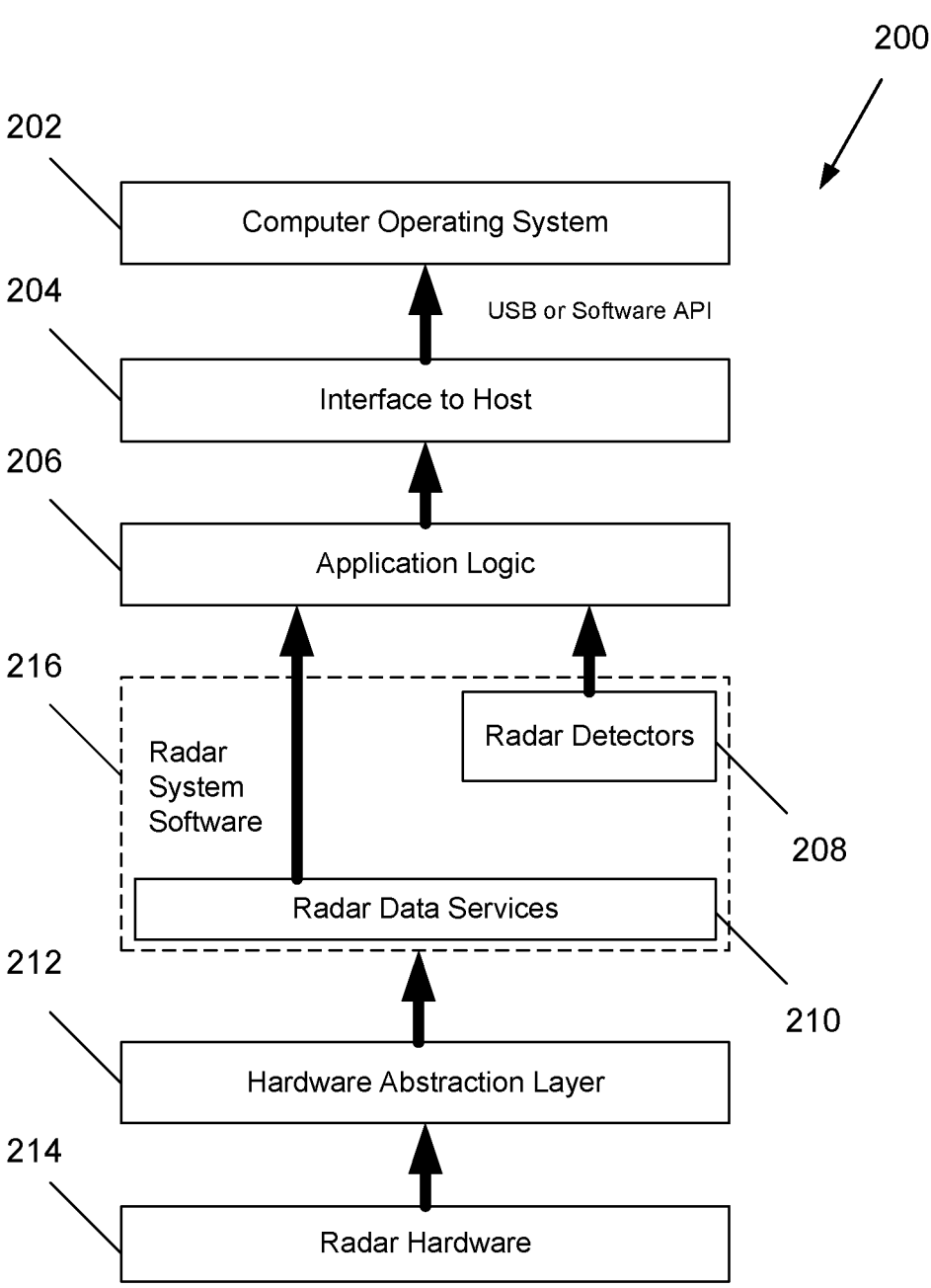
FIG. 3 is a schematic diagram showing exemplary delineations of keyboard—computer logical architecture.

The objective of the system 10 is to put the connected computer device 12 to sleep when user presence is no longer detected. This can be achieved in a variety of ways where the system 10 is embodied wholly, or partly, in the keyboard 100 shown in FIG. 2. Exemplary delineations of keyboard—computer logical architecture 200 are set out in FIG. 3. The Logical elements within the system architecture 200 are summarised as follows:

| System Element: | Description: |
| --- | --- |
| Computer Operating System (202) | The operating system of the computer. This can be Windows, macOS, Linux, etc. |
| Interface to Host (204) | The interface between the Keyboard 10 and the computer. This is a software protocol over USB. |
| Application Logic (206) | The decision-making logic of the solution. Here the logical decisions are made around when to put the connected computer to sleep.<br>This logical unit may reside in the firmware of the keyboard 10 or within a software application on the connected computer. |
| Radar Detectors (208) | Optional services which take the outputs from the Radar Data Services and perform additional analytical processing on the information from the Data Services.<br>In the case of the Keyboard 10, the Presence Detector is used to determine if a person is present.<br>The use of a Detector is not mandatory, as it is possible to make the same determination directly from the data provided by the Radar Data Services.<br>The Radar Detectors may be implemented either in firmware on the keyboard 100 or within a software application on the connected computer 12. |
| Radar Data Services (210) | Software library provided by Acconeer.<br>This controls the configuration and operation of the radar sensor. It also processes the signal data being returned from the radar sensor to turn the data into useful understandable information.<br>The outputs of the Radar Data Services are available for inspection by the Application Logic. Additionally, these outputs may be analysed by a Radar Detector.<br>The Radar Data Services may be implemented either in firmware on the keyboard 10 or within a software application on the connected computer. |
| Hardware Abstraction Layer (212) | The embedded firmware responsible for communication between the MCU and the Radar sensor. |
| Radar Hardware (214) | The physical Radar IC, Acconeer A111 in our case |

We have above described an example of the radar sensor being an Acconeer A111. Alternatively, the system 10 includes any other suitable radar sensor that can detect small movements of the user 14 in a similar manner to the Acconeer A111.

Figure 4A:
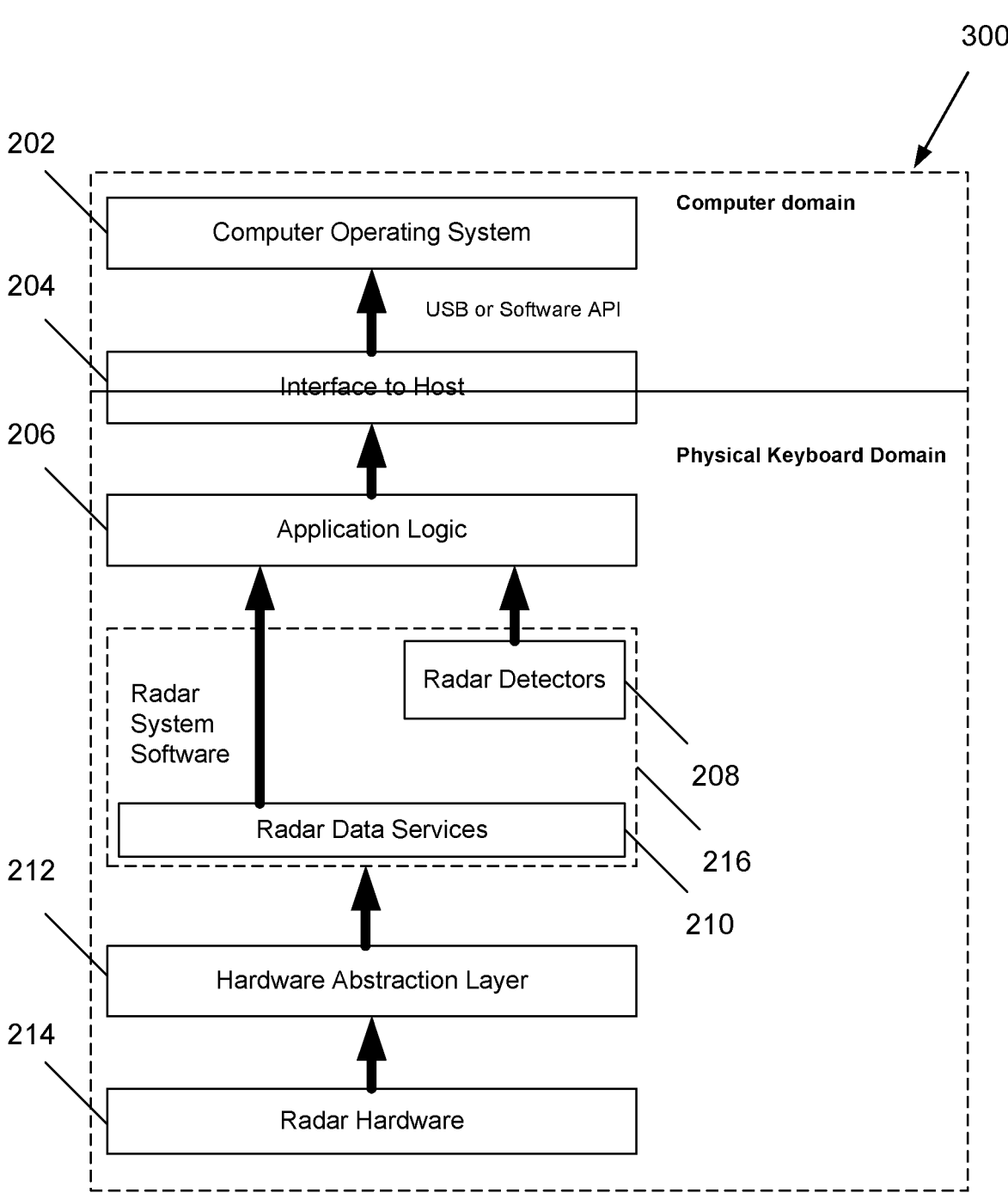
FIGS. 4a to 4c are schematic diagrams showing exemplary delineations of keyboard—computer logical architecture.
Figure 4B:
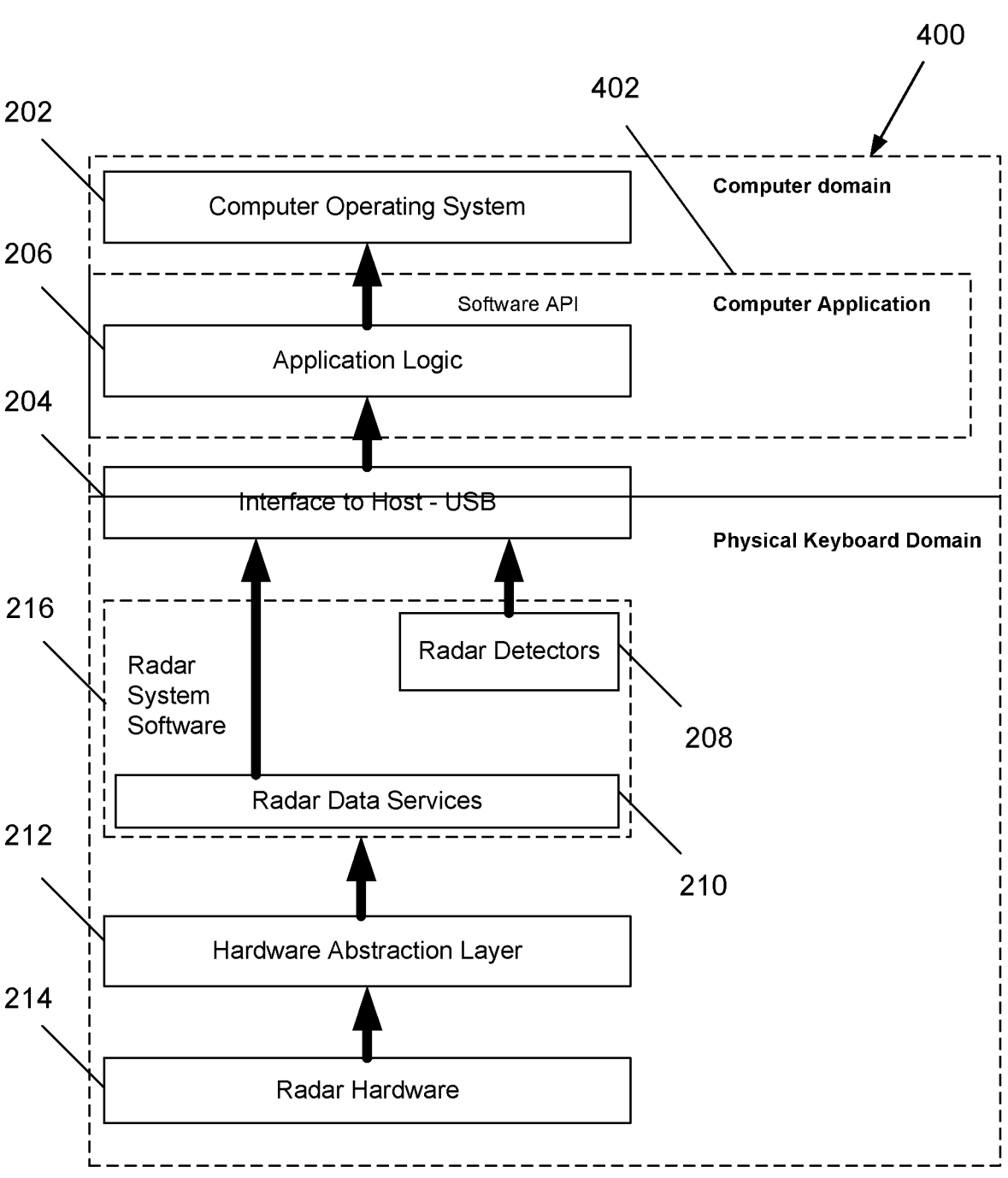
Figure 4C:
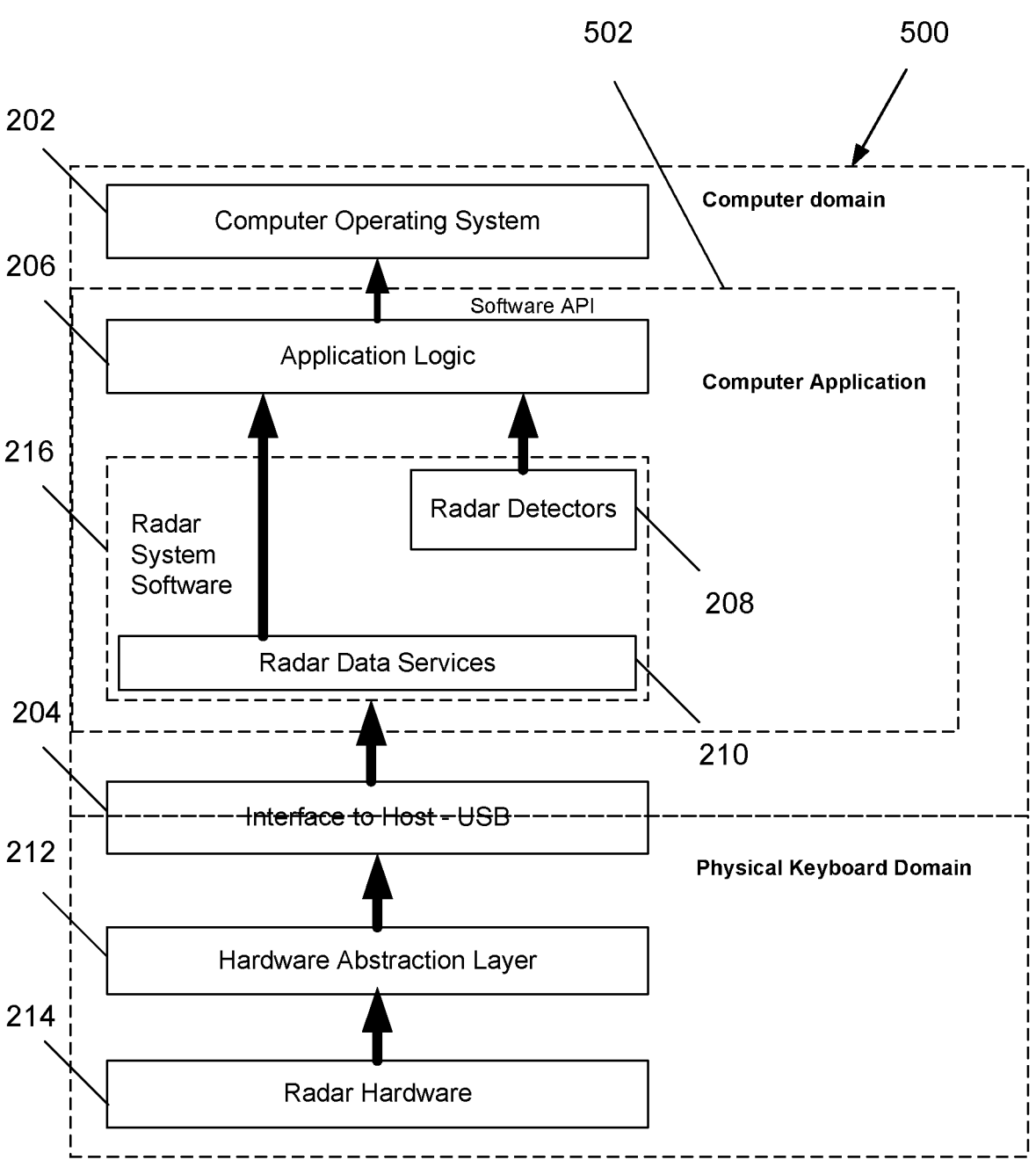

Conceptually the implementation of the overall system 10 can have the delineation between of responsibilities placed at several points in the system architecture 200. A number of the delineation points within the total system architecture 200 will yield a valid solution, however some configurations have practical implications in terms of software effort, robustness, USB interface requirements and long-term maintainability. Put another way, there are multiple points where the interface between the Keyboard 100 and the computer device 12 can be placed, and the same outcome achieved. For ease of description, below described are examples of three such configurations:

(a) On-Keyboard Processing—processing performed on the keyboard 100, where the computer device 12 simply receives a "sleep mode" command from the system 10 with the system architecture 300 shown in FIG. 4*a*; and (b) Hybrid Processing—processing performed on both the keyboard 100 and computer device 12 with the system architecture 400 shown in FIG. 4*b*; and (c) On-Computer Processing—the system 10 includes processing performed on the computer device 12 with the system architecture 500 shown in FIG. 4*c*.

The components of the system 10 can be implemented in software to be executed on standard computer hardware. A number of the components, or parts thereof, may also be implemented by application specific integrated circuits (ASICs) or field programmable gate arrays.

The keyboard 100 includes a plurality of keys 102 arranged for engagement with fingers 18 of the user 14 of the keyboard 100. The keyboard 100 includes a housing 104 that includes the following layers:

(a) Rubber Dome layer;

(b) Top Membrane Layer;

(c) "Hole" layer; and (d) Bottom Membrane Layer.

Of course, the keyboard 100 could alternatively include other suitable configurations of the housing 104

1. The System 10 with On-Keyboard Processing

The system logical structure 300 set out in FIG. 4*a* shows the keyboard 10/computer 12 delineation point. In this configuration, the system 100 has the following configuration:

(a) The Radar Data Services 210 are performed locally on the keyboard 100;

(b) The Radar Detectors 208 are performed locally on the keyboard 100; and (c) The Application Logic 206 is performed locally on the keyboard 100.

The interface between the system 10 and the host computer 12 is via USB cable 106, for example, sending USB HID commands. This approach requires no dedicated software on the connected computer 12. Rather, the application Logic sends the necessary USB command(s) to the connected computer 12 to put it into sleep mode.

Over USB, a single command is required to put a PC to sleep whereas a MAC requires multiple commands to be sent to achieve the same outcome. The available command set is defined by the USB standard.

The system 10 additionally supports wireless communication. This aspect of the system 10 functionality is not used in the USB version of the keyboard 100.

Figure 5:
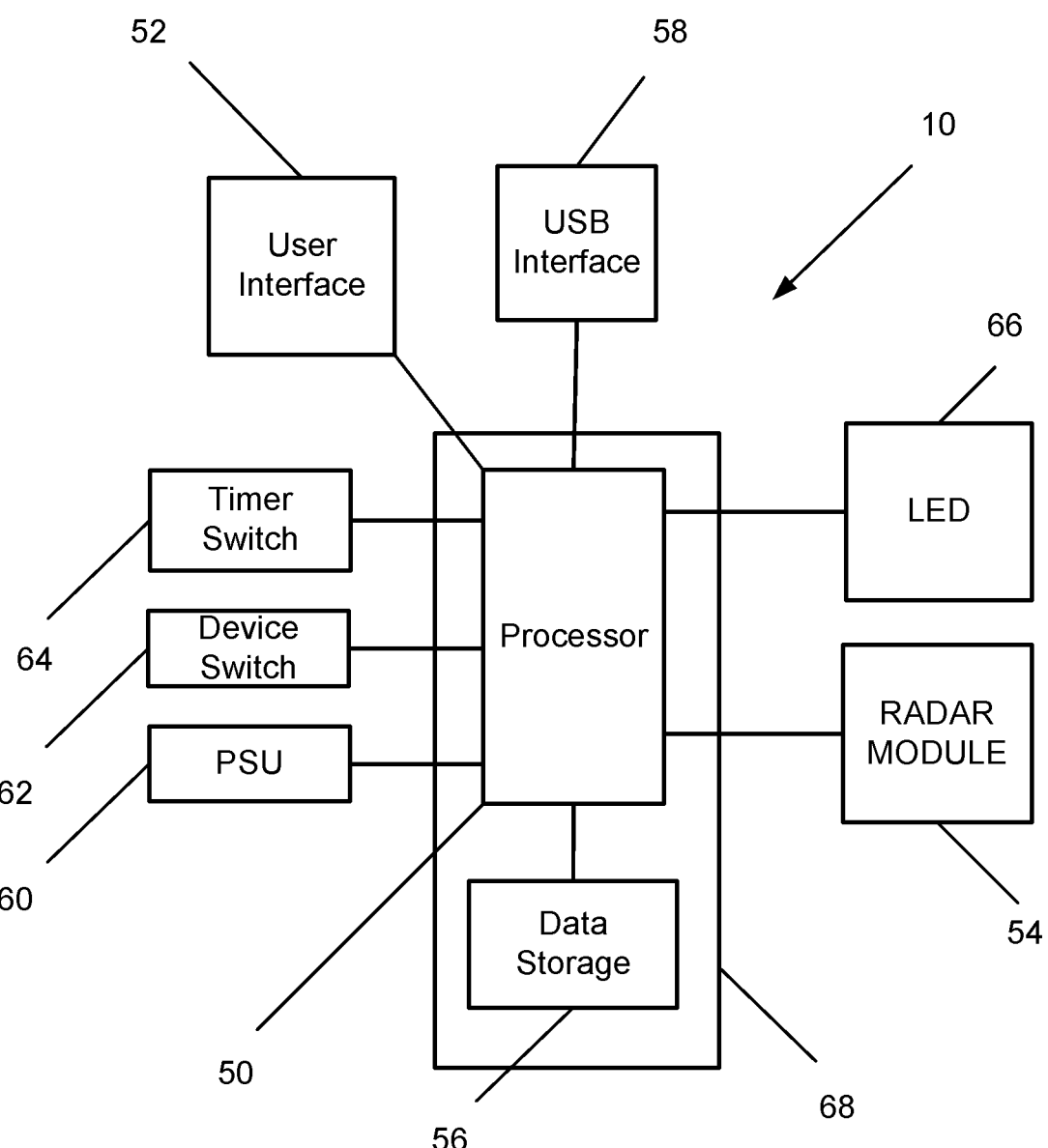
FIG. 5 is a schematic illustration of the keyboard system shown in FIG. 1.

As shown in FIG. 5, the system 10 seated in the housing 104, including one or more processors 50 in communication with:

(i) a user interface 52 including an array of keys 102 for engagement by a user 14;

(ii) a radar module 106 for detecting movement of the user 14; and (iii) data storage 56, including instructions stored thereon that, when executed by the one or more processors 50, cause the system 10 to perform the steps of:

(A) activating a sleep timer to count for a predetermined amount of time;

(B) generating motion data with the radar module 54;

(C) if the motion data indicates that movement has been detected, then repeat steps (A) to (B);

(D) if the sleep timer has not expired, then repeat step (B);

(E) sending a sleep mode instruction to the computer device 12 connected to the system 10.

As above mentioned, in order to safe guard against the requirement for manually configuring the computer device 12 to enter lock mode, some embodiments of the system 10 are configured to send a lock mode instruction to the computer device 12 instead of the sleep mode instruction. The lock mode instructions are securely stored in data storage. In this embodiment, the system 10 puts the computer device 12 into lock mode when the presence of a user 14 is no longer detected data is protected.

Alternatively, the system 10 is configured to send a lock mode instruction to the computer device 12 in addition to the sleep mode instruction. In this embodiment, the system 10 has the benefits of power savings, together with certainty that the data is protected when the computer device 12 enters sleep mode.

For ease of description, the system 10 is below described by way of reference to sending a sleep mode instruction to the computer device. However, the system 10 can be configured to alternatively send a lock mode instruction, or both.

The radar module 54 is a system that includes a radar sensor 208 (also referred to as radar detector 208) that is preferably centrally disposed on a front side 108 of the keyboard housing 104, directly facing the user. Advantageously, the sensor 208 is located in this position to give optimal field-of-view for detecting the absence of the user 14.

In another embodiment, the sensor is located on a lateral side of the housing 104, arranged to point back to the user 14.

In one embodiment, the sensor faces upward from the housing 104 toward the user at angle of 45 degrees, for example. In this embodiment, instead of detecting the presence of the belly of the user 14, the sensor detects movement in the head and torso which more frequently move. The angle of the radar sensor is preferably adjustable. For example, the sensor is hingedly coupled to the housing 104.

Advantageously, the system 10 detects small movements in the user 14. Such small movements include:

hand movement, for example during typing;

head movement, during reading, typing, dictation, presenting, talking, and so on; and a person not moving and just breathing The radar is able to detect very fine movements of a person 14, down to the level of detecting the movement generated by breathing alone. The human body is always generating small movements, even when sitting perfectly still, and the radar sensor is able to detect these small motions. The sensor is, for example, able to detect movements of just one mm, which many other sensing technologies are not able to detect.

For example, the system 10 has horizontal and vertical motion detection range of 0.1 m to 1.25 m, or 60 mm to 2000 mm, depending on the radar module. This, in turn, allows the system 10 to only put the computer device 12 in sleep mode when the user 14 moves away, as opposed to just being still for a prolonged period.

As shown in FIG. 5, the keyboard system 10 includes the following features:

(a) User Interface 52;

(b) a Universal serial bus (USB) interface 58;

(c) a Power Supply Unit (PSU) 60;

(d) Processor(s) 50 & Data Storage 56;

(e) Operating System Slide Switch 62;

(f) Timer Selection Slide Switch 64;

(g) Light Emitting Diode (LED) 66; and (h) Radar Module 54.

The configuration and operation of each one of these features is set out below.

(a) User Interface 52

The user interface 52 includes a plurality of keys 102 supported by the housing 104. The arrangement of keys 102 include:

(a) Alphabetic keys 102*a*;

(b) Function keys 102*b*;

(c) Numeric Keys 102*c*; and (d) Punctuation keys 102*d*.

The keys 102 also include a "Sleep" key 102*e*. As shown, the sleep key 102*e* is preferably located in an upper right hand corner of the keyboard 100. As explained in further detail below, when the sleep key 102*e* is pressed, the keyboard 100 transmits a Sleep Mode signal to the computer device 12.

Figure 6:
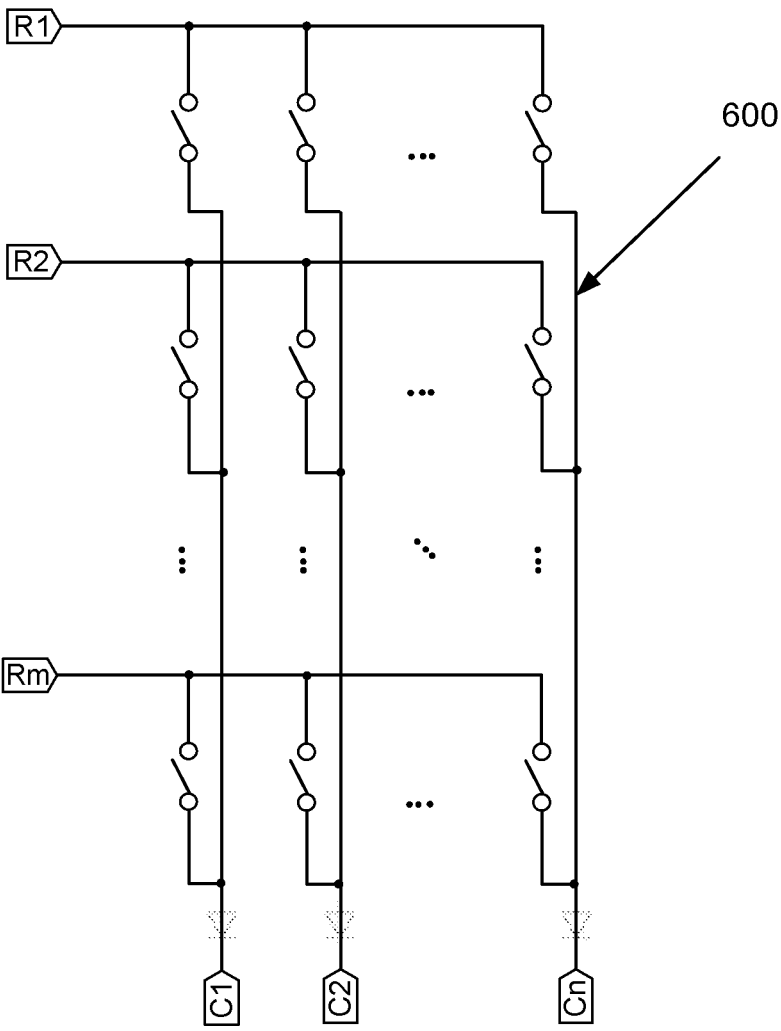
FIG. 6 is a circuit diagram of a keyboard array.

As shown in FIG. 6, the user interface 52 includes a key press detection system 600 including a row/column key matrix, in a manner common with most commercially available computer keyboards. For example, the keyboard press detection system 600 consists of a matrix where there are intersecting row and column electrical circuits. When a key 102 is pressed by a user 14, it forms an electrical connection between one row and one column.

The keyboard press detection system 600 runs through a routine which scans the columns. If a key is pressed, then a signal will appear on one of the column connections. By knowing which row was driven at the time, the exact key being pressed can be determined. This process is repeated hundreds of times per second by the keyboard press detection system 600.

The results of the key scanning process are reported to the computer device 12 as "press" and "release" events on the keys of the keyboard 100.

(b) USB Interface 58

The system 10 connects to the host computer 12 via a USB 2.0 interface 58, using a Type "A" male USB connector plug. This is an industry standard method of connecting keyboards to computers. Alternatively, the connection can be any version of USB. For example, USB 1.0 or 1.1.

The keyboard 100 draws less than 100 mA at 5V from the USB interface 58, as per the USB specification for HID class devices. The functional block that enables the unit to communicate via USB is built-in to the data storage 56. Minimal external circuitry is required to achieve communication.

(c) Power Supply Unit (PSU) 60

The system 10 uses a simple linear regulator to regulator is used to produce a suitable low voltage power supply for the system components, including the one or more processors 50, data storage 56 and the Radar Module 54. For instance, in this embodiment a 1.8V supply is used, but its quite valid to go source parts from someone else that run from 3.3V.

The Power Supply Unit 60 functionality is achieved through use of a commercially available linear voltage regulator integrated circuit (IC), of a type common to many electronic devices.

(d) Processor(s) 50 and Data Storage 56

As above mentioned, the system 10 includes one or more processors 50 in communication with data storage 56. In one embodiment, the system 10 uses a microcontroller unit (MCU) 68 with a single processor 50 and data storage 56. For example, the system 10 uses the MCU 68 from Nordic Semiconductor. The specific part is an nRF52840 System-on-Chip. Alternatively, any other suitable MCU 68 with one or more processors 50 could be used.

Key device specifications of the MCU 68 for the system 10 are, for example, as follows:

Processor: 64 MHZ ARM Cortex-M4 with a floating point unit (FPU)

Data storage: 1 MB Flash

256 KB RAM

Peripherals: Universal Asynchronous Receiver/Transmitter (UART)

Serial Peripheral Interface (SPI)

Two Wire Interface (TWI)

Pulse Density Modulation (PDM)

Inter-IC Sound (I2S)

Quad SPI (QSPI)

PWM 12-bit ADC

USB 2.0

The MCU 68 additionally supports wireless communication with the computer device 12.

High-level functions performed by the MCU 68 include, but are not limited to:

Communication with the host computer 12 via USB

Reading the position of the selection switches 62, 64 (PC/MAC and Timer)

Communication with the Radar Module 54

Mathematical processing of the raw data from the Radar Module 54

Keyboard Matrix scan and decode 600

Status LED control 66

(e) Operating System Slide Switch 114

The system 10 contains an operating system (OS) slide switch 62. This OS switch 62 is for selecting the type of operating system being used by the computer device 12 the system 10 is connected to. In the example shown, the OS slide switch 62 has two positions for selecting between a Microsoft Windows based OS and an Apple Mac based OS.

Data storage 56 includes a set of instructions for each type of OS that the system 10 will interface with, each including appropriate commands for putting the computer device 12 in sleep mode. Additionally, the functionality of some of the physical keys on the keyboard 100 is different under different operating systems.

Figure 7:
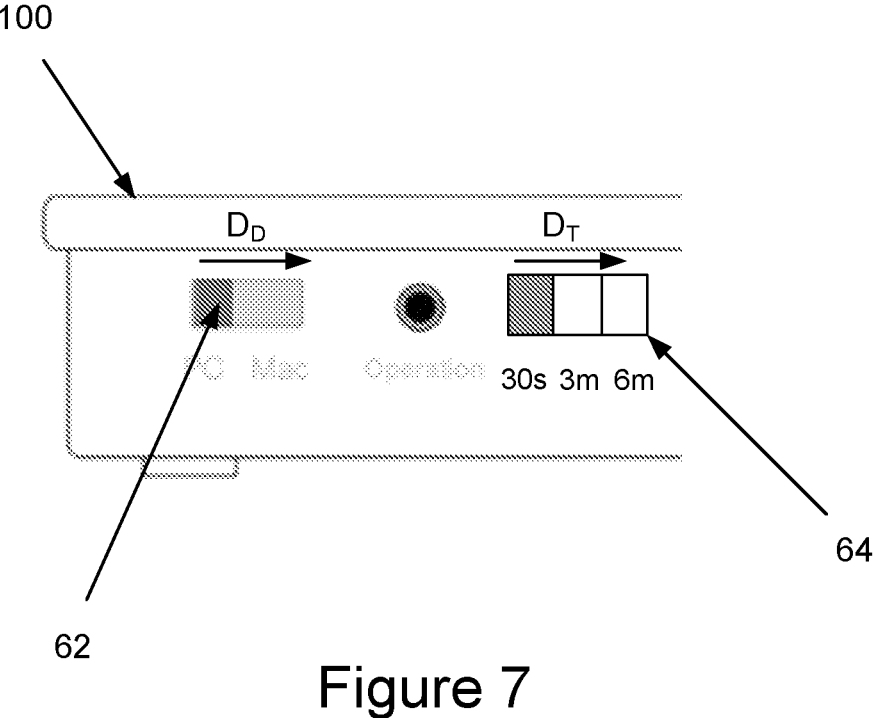
FIG. 7 is a back end view of a section of the keyboard shown in FIG. 2.

As shown in FIG. 7, the OS slide switch 62 is movable in direction DD to toggle between PC and Mac.

(f) Timer Selection Slide Switch 64

The system 10 includes a timer selection (TS) slide switch 64 that is used to set a predetermined "Count Down" timer. This is the time period the system 10 will wait, after detecting that a user 14 is no longer in front of the keyboard

100, before the system 10 will send the command to the connected computer device 12 to put it to sleep.

As shown in FIG. 7, the TS slide switch 64 is configurable to select between multiple predetermined times by movement in direction DT. In the example shown in FIG. 7, the following time periods:

30 seconds
    3 minutes
    6 minutes (g) Light Emitting Diode (LED) 66

The system 100 includes a single status LED 66. This Status LED 66 is located under the Sleep key 102e. The Status LED 66 has the following three states:

a) On—The computer 12 connected to the keyboard 100 is "On"
    b) Off—The computer 12 connected to the keyboard 100 is "Off"
    c) Blinking—The count-down to put the connected computer 12 to sleep has reached the final 5 seconds of the count-down (h) Radar Module 54

Figure 8:
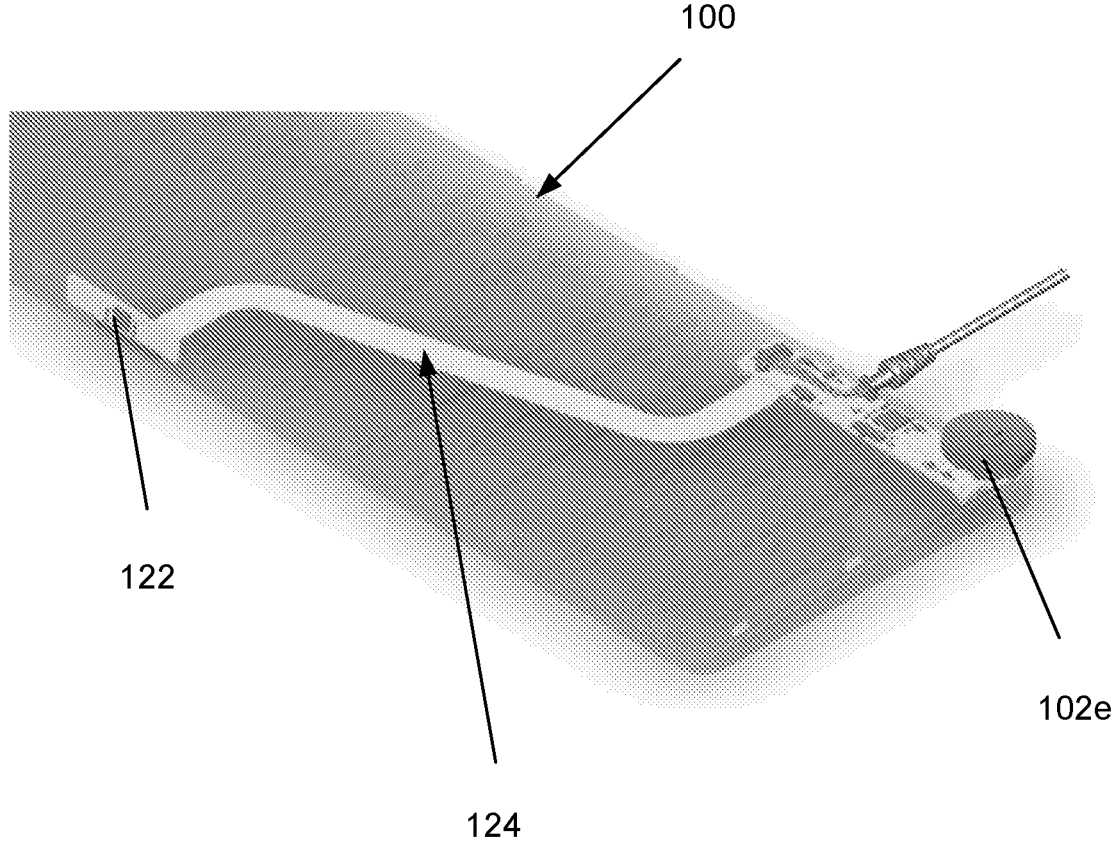
FIG. 8 is a diagrammatic illustration of a radar module—processor interface of the system shown in FIG. 1.

As shown in FIG. 8, the Radar Module 54 includes a radar IC 122. The radar IC 122 is described with reference to a commercially-available radar IC from Acconeer, such as model number A111. However, the keyboard system 10 could use any other suitable radar IC 122.

The radar IC 122 has the following key parameters:

Sensor Type:
    60 GHz pulsed coherent radar (PCR), short-range device (SRD)

Measures absolute range:
    60-2000 mm (spherical corner reflector r=50 mm)

Continuous sweep update rate:
    Configurable up to 1500 Hz

Multiple objects:
    Yes

Half Power Beam Width (HPBW):
    40°/80°

Need for Aperture:
    No

Interface:
    SPI, GPIO (optional)

Power supply:
    1.8V single power supply

Power consumption:
    <1 mW (10 Hz update frequency)

Package:
    FCCSP, 5.5×5.2×0.88 mm

The radar IC 122:

(a) is a low power, high precision, pulsed short-range radar sensor with a footprint of only 29 mm2.

(b) is delivered as a one chip system in package (SiP) solution with embedded radio and antenna.

(c) has millimetre accuracy with very low power consumption. By operating in the 60 GHz unlicensed ISM radio band, the radar sensor provides robust performance without interference from noise, dust, colour nor direct or indirect light.

Figure 9A:
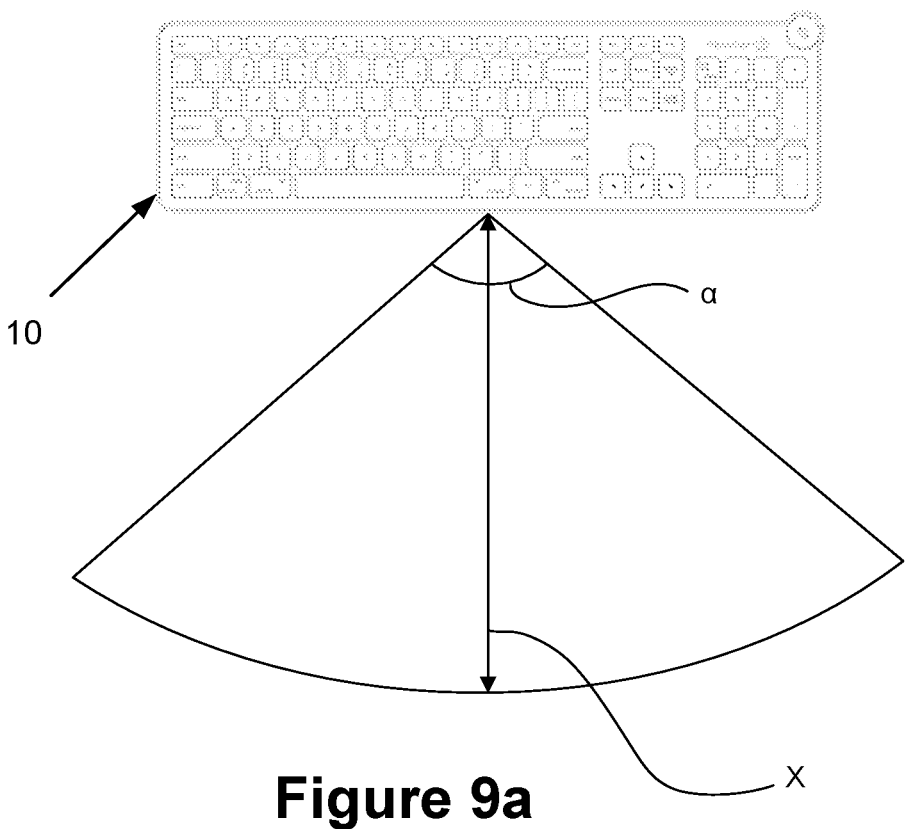
FIGS. 9a and 9b are illustrations of a radar detection field associated with the system shown in FIG. 1.
Figure 9B:
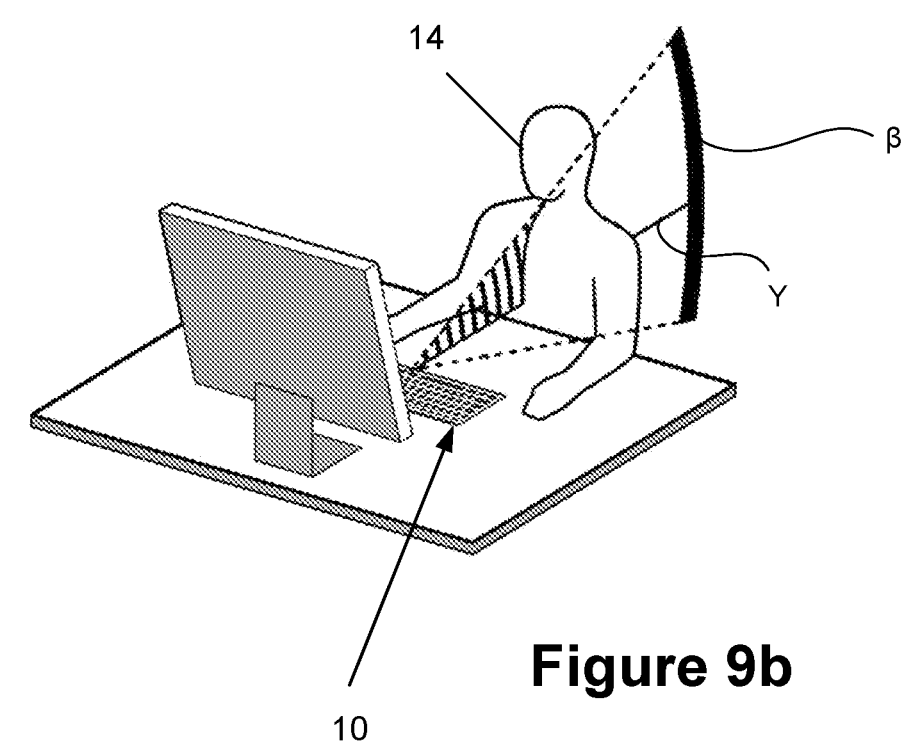

As shown in FIGS. 9a and 9b, the detection field for the radar IC 122 is:

α degrees in the horizontal plane
    β degrees in the vertical plane
    X,Y meters in the front of the keyboard 10

Preferably α is 60 degrees in the horizontal plane and ß is 60 degrees in the vertical plane. Preferably X and Y are in the range of 0.1 m to 1.25 m from the front of the keyboard 10.

MCU 68 and Radar Module 54 Interconnect

The printed circuit board (PCB) for the MCU 68 resides in the right rear corner of the keyboard 100. The PCB for the MCU 68 is electrically connected to:

(a) the TS slide switch 64;
    (b) the interconnection to the keyboard matrix 600;
    (c) the USB cable 106;
    (d) the OS slide switch 62; and
    (e) the housing 104.

The radar IC 122 is centrally disposed on a front side 108 of the keyboard housing 104, directly facing the user 14. It is located in this position to give optimal field-of-view for detecting the absence of the user 14.

The MCU 68 PCB and Radar IC 122 PCB are linked with a flexible PCB 124 (S-shaped in FIG. 8).

Basic Operation of the Radar Module 54

Operation of the radar module 54 is controlled by several data registers. The raw output of the radar IC 122 is sent back to the MCU 68 for processing.

The data storage 56 includes software libraries for the radar IC 122 that are executable by the MCU 68. These libraries, and the interface to them, are hereafter referred to as the Radar System Software (RSS) 216.

The RSS 216 is run on the MCU 68. The RSS 216 processes the raw returned data from the radar IC 122. As the radar IC 122 is in the public domain, the algorithms that it performs in order to process the data is not explained here in further detail. The outputs from the RSS 216 are made available to the host MCU 68 to inspect the results.

Detectors and Services

Figure 10:
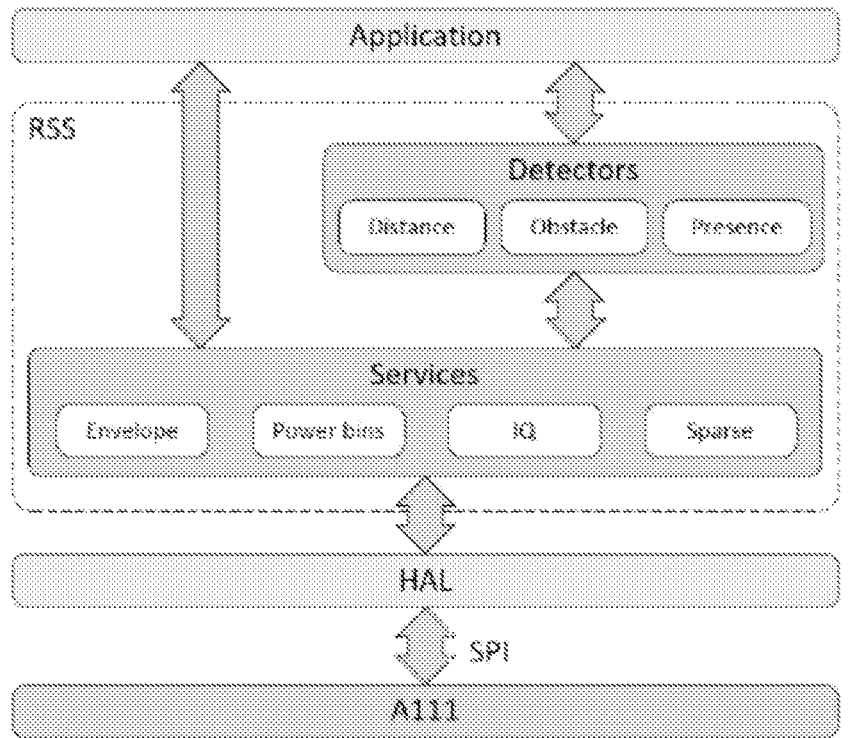
FIG. 10 is a schematic diagram of a Radar System Software detector and service architecture.

With reference to FIG. 10, the RSS 216 provides output at two different levels:

Service Data
        The Service data output is pre-processed sensor data as a function of distance.
    Detector Data
        Detectors are built with this Service data as the input and the output is a result, in the form of e.g. distance, presence, angle etc.

Radar Operating Mode in System 10

In the system 10, the primary goal is to detect the presence, or absence, of a person 14 in the field of view. To configure the radar IC 122 to perform this function utilises the following RSS functions:

Service data—Sparse
    Detector data—Presence

Radar IC 122 RSS 216 Presence Detector

The final outputs from the radar IC 122 RSS Presence Detector, after processing the data from the sensor, are:

A binary Motion output as to whether the sensor does, or does not, detect a person in the field of view; and
    A score indicating the mathematical confidence level of the detection.

Application Processing

Figure 11:
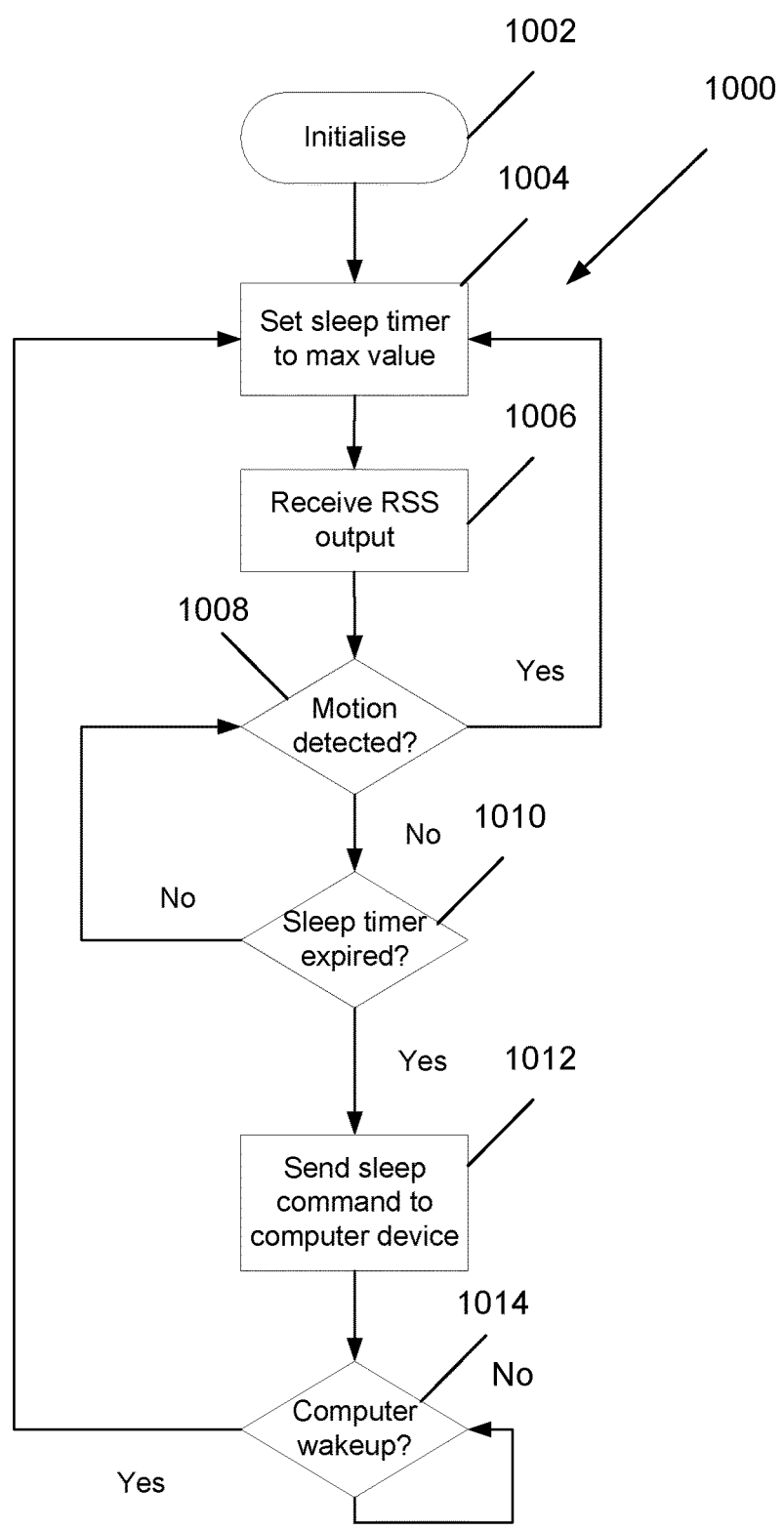
FIG. 11 is a flow diagram of an example of a method steps executed by the keyboard system for setting a computing device to a sleep mode.

At start-up of the keyboard 100 using the power button 102e, or any other key 102, by moving a connected moue, the keyboard system 10 performs the steps 1000 shown in FIG. 11, including:

(a) initialising, at step 1002, the radar module 54 by loading the correct settings into the RSS and this, in turn, loads the corresponding settings into the A111 radar IC 122; and
    (b) setting, at step 1004, a sleep timer to the maximum value, corresponding to the timing switches 64 set by the user 14.

The system 10 then switches to normal operation which includes the step of receiving, at step 1006, RSS motion outputs. Advantageously, these motion outputs are received by the MCU 68 every 20 milliseconds. The system determines, at step 1008, if the motion output from the RSS indicates that motion has been detected. As above mentioned, the motion output is binary:

$$1 = \text{motion detected}$$
$$0 = \text{no motion detected}$$

If the motion is detected, the system 10, at step 1004, resets the Sleep Timer back to the maximum value. If the no motion is detected, then the system 10 checks, at step 1010, if the Sleep Timer has expired:

(a) If the sleep timer has not expired, then the system 10 continues to count down by returning to again checking, at step 1008, if motion is detected; or (b) If the Sleep timer has expired, then the system 10 sends, at step 1012, the necessary commands over USB to the host computer device 12 to put it to sleep.

Once the Sleep Timer reaches 5 seconds, or less, the system 10 activates the Status LED 66 to blink, indicating that the keyboard 100 is about to put the host computer 12 to sleep.

2. The System 10 with Hybrid Processing

The system logical structure 400 is set out in FIG. 4b shows the keyboard/computer delineation point. In this configuration, the logical processing is shared between the keyboard 100 and the connected computer 12.

(a) The Radar Data Services are performed locally on the keyboard 100.

(b) The Radar Detectors are performed locally on the keyboard 100.

(c) The Application Logic is performed by a piece of software 402 on the connected computer 12.

The interface between the keyboard 100 and the host computer 12 is via USB. This is implemented using a USB data service to transfer the outputs from the Radar System Software (either Data Service outputs or Detector outputs) to the computer 12.

The architecture 400 includes a dedicated software application on the PC 12, to perform the following functions:

(a) Receive and understand the data being sent to the PC 12 by the Radar System Software running on the keyboard 100;

(b) Perform the Application Logic regarding when to put the computer 12 into sleep mode; and (c) Make the appropriate software function calls to the host operating system to put the computer to sleep.

The outcome is that the software application, containing the Application Logic, makes the necessary system function calls to put the computer to sleep.

As above mentioned, in order to safe guard against the requirement for manually configuring the computer device 12 to enter lock mode, some embodiments of the system 10 are configured to send a lock mode instruction to the computer device 12 instead of the sleep mode instruction. The lock mode instructions are securely stored in data storage. In this embodiment, the system 10 puts the computer device 12 into lock mode when the presence of a user 14 is no longer detected data is protected.

Alternatively, the system 10 is configured to send a lock mode instruction to the computer device 12 in addition to the sleep mode instruction. In this embodiment, the system 10 has the benefits of power savings, together with certainty that the data is protected when the computer device 12 enters sleep mode.

3. The System 10 with On-Computer Processing

Figures 12A, 12B:
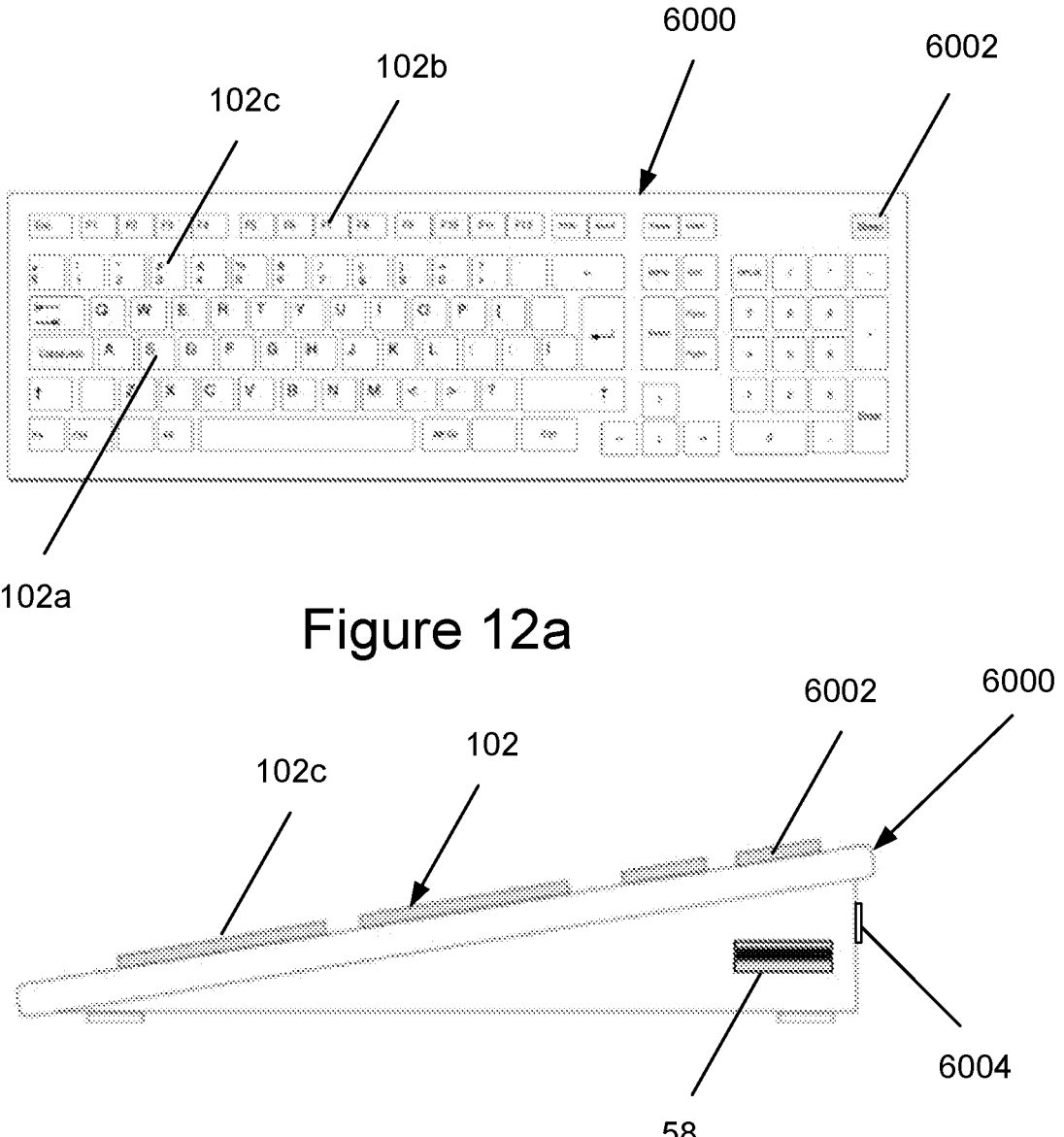
FIGS. 12a and 12b are diagrammatic illustrations of alternative embodiments of the keyboard shown in FIG. 2.

System logical structure 500 is set out in FIG. 12 which shows the keyboard/computer delineation point. In this configuration, the logical processing is predominantly executed on the connected computer 12.

(a) The Radar Data Services are performed by a piece of software 502 on the connected computer.

(b) The Radar Detectors are performed by a piece of software 502 on the connected computer.

(c) The Application Logic is performed by a piece of software 502 on the connected computer.

The primary function on the keyboard 10 is to transfer the data from the radar sensor 122 to the computer 12 for further processing.

The interface between the keyboard 100 and the host computer 12 is via USB. This is implemented using a USB data service to transfer the raw unprocessed radar outputs to the computer 12, coming from the Hardware Abstraction Layer. Minimal processing of the raw radar outputs is performed on the keyboard 100 in this case.

The architecture 500 includes a dedicated software application on the PC 12, to perform the following functions:

(a) Receive and understand the data being sent to the PC 12;

(b) Execute the Radar System Software functions of both Radar Data Services and Radar Detectors;

(c) Perform the Application Logic regarding when to put the computer to sleep; and (d) Make the appropriate software function calls to the host operating system to put the computer into sleep mode.

The outcome is that the software application 502, containing the Application Logic and Radar System Software, makes the necessary system function calls to put the computer to sleep.

As above mentioned, in order to safe guard against the requirement for manually configuring the computer device 12 to enter lock mode, some embodiments of the system 10 are configured to send a lock mode instruction to the computer device 12 instead of the sleep mode instruction. The lock mode instructions are securely stored in data storage. In this embodiment, the system 10 puts the computer device 12 into lock mode when the presence of a user 14 is no longer detected data is protected.

Alternatively, the system 10 is configured to send a lock mode instruction to the computer device 12 in addition to the sleep mode instruction. In this embodiment, the system 10 has the benefits of power savings, together with certainty that the data is protected when the computer device 12 enters sleep mode.

Alternative Keyboard 6000

The alternative keyboard 6000 shown in FIGS. 13a and 13b operates in an analogous manner to the keyboard 10 and like parts are shown with like reference numbers. In this embodiment, the LED 66 of the keyboard 100 is replaced with a dual green blue LED 6002 which has the following modes:

(a) Power Up—the LED 6002 flashes blue for 3 seconds;

(b) Computer in normal use—the LED 6002 illuminates continuously blue when the remaining Countdown Timer duration is >30 seconds;

(c) Countdown timer warning—LED 6002 flashes green slowly on and off when the remaining Countdown Timer duration is <30 seconds;

(d) Computer in sleep mode—the LED 6002 will extinguish;

(e) Configuration mode—the LED 6002 illuminates green; and (f) For countdown timer confirmation the LED 6002 flashes green.

The keyboard 6000 includes a user configurable Countdown Timer with the following durations:

30 seconds 1 minute 3 minutes 10 minutes 20 minutes 30 minutes

Configuration mode is enabled via a long button press of a dedicated "Configuration" push button 6004 located on the back or underside of the keyboard 6000.

Configuration

Step 1: Press-and-hold the operation button 6004 for >5 seconds to enter configuration mode. LED 6002 will illuminate blue Step 2: Press operation button 6004 the number of times to configure Countdown Timer.

For Sleep Mode:

1 1 press=30 seconds

2 2 press=1 minutes

3 3 press=3 minutes

4 4 press=10 minutes

5 5 press=20 minutes

6 6 press=30 minutes 3 seconds after press LED 6002 will flash blue LED according to the number of button presses. After no user input for 6 seconds keyboard 6000 changes to normal operation mode. The above timer settings are exemplary only and any other suitable arrangement could alternatively be used.

The default Setting, factory Setting for a PC, is Countdown timer=3 minutes, for example.

Many modifications will be apparent to those skilled in the art without departing from the scope of the present invention Throughout this specification, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not, and should not be taken as, an acknowledgment or any form of suggestion that the prior art forms part of the common general knowledge in Australia.

The invention claimed is:

1. A keyboard connected to a computer device for putting the computer device into sleep mode, the keyboard comprises a system being configured to:

(a) activate a timer to count for a predetermined amount of time;

(b) generate motion data with a radar module;

(c) if motion data received from the radar module indicates that movement of a user of the computer device has been detected, then repeat steps (a) & (b);

(d) if the timer has not expired, then repeat step (b); and (e) generate a sleep mode instruction to put the computer device into sleep mode;

wherein the system allows for different configurations for processing the motion data and generating the sleep mode instruction;

wherein the different configurations of the system comprise the following configurations:

(i) processing the motion data on the keyboard, and the sleep mode instruction is generated by the system to put the computer device into sleep mode;

(ii) processing the motion data on the keyboard, and the sleep mode instruction is generated by the computer device to put the computer device into sleep mode;

(iii) processing the motion data on the computer device, and the sleep mode instruction is generated by the computer device to put the computer device into sleep mode, wherein the keyboard is a physical and the system is housed within or partly within the keyboard;

wherein the keyboard further comprises:

a microcontroller unit to support communication with the computer device and operations of the system;

a user configurable timing slide switch for setting the predetermined amount of time for the timer; and an operating system slide switch for selecting a type of operating system being used by the computer device so that the correct sleep mode instruction can be generated for the operating system.

2. The keyboard claimed in claim 1, wherein the radar module includes a radar sensor that is disposed on a front side of the keyboard that, at least in part, houses the system.

3. The keyboard claimed in claim 2, wherein the radar sensor is centrally disposed on the front side of the keyboard.

4. The keyboard claimed in claim 2, wherein the radar sensor is directed upwards to scan an upper section of the user.

5. The keyboard claimed in claim 4, wherein the angle of the radar sensor is adjustable with respect to a horizontal plane.

6. The keyboard claimed in claim 1, wherein the radar module includes a radar sensor that is disposed on a lateral side of the keyboard that, at least in part, houses the system.

7. The keyboard claimed in claim 1, wherein the radar module has horizontal and vertical motion detection in the range of 0.1 m to 1.25 m.

8. The keyboard claimed in claim 1, wherein the user configurable timing slide switch includes at least the following settings:

(a) 30 seconds;

(b) 3 minutes; and (c) 6 minutes.

9. The keyboard claimed in claim 1, wherein the system is configured to send a lock mode instruction to the computer device in addition to the sleep mode instruction.

10. A keyboard connected to a computer device, the keyboard comprises a system for putting the computer device into sleep mode, including one or more processors in communication with:

(a) a radar module for detecting movement of the user; and (b) data storage, including instructions stored thereon that, when executed by the one or more processors, cause the system to perform the steps of:

(i) activating a timer to count for a predetermined amount of time;

(ii) generate motion data with the radar module;

(iii) if the motion data indicates that movement has been detected, then repeat steps (i) to (ii);

(iv) if the timer has not expired, then repeat step (ii);

(v) generating a sleep mode instruction to put the computer device into sleep mode;

wherein the system allows for different configurations for processing the motion data and generating the sleep mode instruction;

wherein the different configurations of the system comprise the following configurations:

(i) processing the motion data on the keyboard, and the sleep mode instruction is generated by the system to put the computer device into sleep mode;

(ii) processing the motion data on the keyboard, and the sleep mode instruction is generated by the computer device to put the computer device into sleep mode;

(iii) processing the motion data on the computer device, and the sleep mode instruction is generated by the computer device to put the computer device into sleep mode, wherein the keyboard is a physical and the system is housed within or partly within the keyboard; and wherein the keyboard further comprises:

a microcontroller unit to support communication with the computer device and operations of the system;

a user configurable timing slide switch for setting the predetermined amount of time for the timer; and an operating system slide switch for selecting a type of operating system being used by the computer device so that the correct sleep mode instruction can be generated for the operating system.

11. The keyboard claimed in claim 10, wherein the radar module includes a radar sensor that is disposed on a front side of the keyboard that, at least in part, houses the system.

12. The keyboard claimed in claim 11, wherein the radar sensor is centrally disposed on the front side of the keyboard.

13. The keyboard claimed in claim 10, wherein the radar module includes a radar sensor that is disposed on a lateral side of the keyboard that, at least in part, houses the system.

14. The keyboard claimed in claim 10, wherein the radar sensor is directed upwards to scan an upper section of the user.

15. The keyboard claimed in claim 14, wherein the angle of the radar sensor is adjustable with respect to a horizontal plane.

16. The system keyboard claimed in claim 10, wherein the radar module has horizontal and vertical motion detection in the range of 0.1 m to 1.25 m.

17. The keyboard claimed in claim 10, wherein the user configurable timing slide switch includes at least the following settings:

(a) 30 seconds;

(b) 3 minutes; and (c) 6 minutes.

18. The keyboard claimed in claim 10, wherein the system is configured to send a lock mode instruction to the computer device in addition to the sleep mode instruction.

* * * * *